United States Patent [19]

Mirman

[11] 4,104,810

[45] Aug. 8, 1978

[54] DISPLAY DEVICE

[76] Inventor: Serge Mirman, 9 Chesham Pl., Belgrave Sq., London SW1, England

[21] Appl. No.: 790,957

[22] Filed: Apr. 26, 1977

[51] Int. Cl.² .............................................. G09B 1/20
[52] U.S. Cl. .......................................... 35/53; 35/77; 40/518
[58] Field of Search ............... 35/28, 53, 77; 40/86 R; 235/131 FD

[56] References Cited

U.S. PATENT DOCUMENTS

| | | | |
|---|---|---|---|
| 247,336 | 9/1881 | George | 40/86 R |
| 809,445 | 1/1906 | Jelliffe | 40/86 R |
| 1,415,712 | 9/1922 | Rontey | 40/86 R |
| 1,692,633 | 11/1928 | Dicomes | 40/86 R |
| 2,234,609 | 3/1941 | Rowe | 35/53 |
| 3,000,560 | 9/1961 | Clancy | 235/131 FD X |
| 3,316,668 | 5/1967 | Rogers | 40/86 R X |
| 3,451,152 | 6/1969 | White | 40/86 R |

FOREIGN PATENT DOCUMENTS 745,911  3/1956  United Kingdom ............. 273/142 JB Primary Examiner—Harland S. Skogquist

[57] ABSTRACT

A display device suitable for illustrating a plurality of interior design schemes or for use as a teaching aid, the device including a case having at least two pairs of spools rotatable therein either manually or semi-automatically, there being a roll of material wound upon each of said pairs of spools, one of said rolls bearing alternative illustrations separated by transparent portions and the other of said rolls bearing a plurality of illustrations complimentary to the illustrations on said one roll, a window in a wall of said case through which the illustrations on the rolls may be viewed, the arrangement being such that by adjusting the spools an illustration made up from the complimentary illustrations on the two rolls can be viewed through the window. A magnetic strip located on one side edge of the case cooperates with magnetically attractable disc members to prevent inadvertent rotation.

10 Claims, 3 Drawing Figures

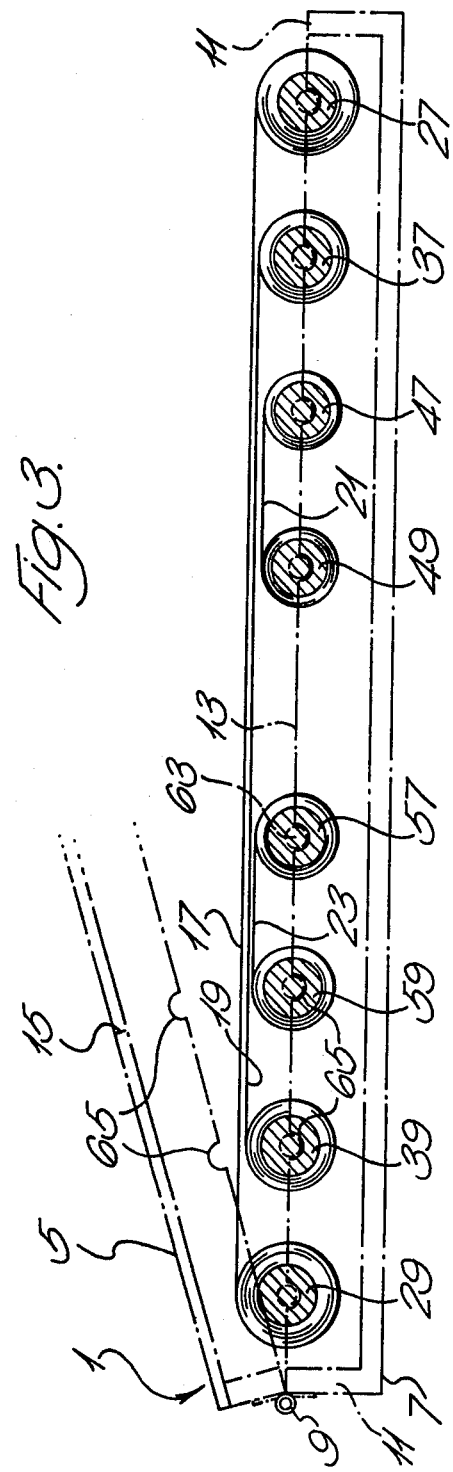

DISPLAY DEVICE

This invention relates to a display device suitable for demonstrating various interior design schemes, kitchen layouts, or even for teaching purposes, e.g. in medical school. In fact, the display device, as well as being useful to interior designers and teachers, could also be used by architects and designers of theatre sets, or for illustrating or building up pictures or replicas of scenes having a background and a foreground, or for building up pictures by degrees, by overlaying one picture with a partly transparent over-printed film, thereby altering the characteristics of the one picture.

Various proposals for illustrating interior design schemes have been put forward in the past, one proposal being the subject of U.S. Pat. No. 3,994,079. In that patent, a picture is built up using foreground and background replicas which are attached by magnetic attraction to a board. There is also disclosed in the same specification an alternative scheme using a multi-leaved book, various leaves representing, for example, the ceiling, walls and floor of a room. While such proposals have proved very successful and are highly effective, it is necessary to have a large number of separate replicas to illustrate various alternative schemes, all of which can easily be damaged and can become lost. Furthermore, when it is desired to replace a portion of the scene with an alternative design, this can take time, especially when the alternative design cannot at first be found. In the case of the multi-leaved book, there is of course a limit to the number of alternative designs which can be illustrated in a single book.

The present invention has been developed so as to overcome some of the disadvantages of the earlier proposed schemes and so as to enable an interior designer or anyone else using the invention to illustrate for example a large range of his various design proposals in a very short passage of time and with the minimum of effort.

According to the present invention, I provide a display device suitable for illustrating a plurality of interior design schemes or for use as a teaching aid, comprising at least two rolls of material each wound or adapted to be wound upon a pair of spools, one of the rolls of material bearing alternative illustrative material separated by transparent portions, a plurality of illustrations complimentary to said illustrative material on the other of said rolls, a case for supporting the rolls on their spools, there being a window in a wall of the case through which the various alternative illustrative material may be displayed with a chosen illustration formed on the other roll showing through a transparent portion of said one roll and the two rolls being suitably relatively orientated so as to build up a picture visible through said window, said spools being rotatably supported in the case and means for rotating each of the spools so as to advance one roll relative to the other as desired in either direction to vary the picture presented at the window.

Preferably, the case is portable and provided with a carrying handle and formed of two superimposed halves, one having a base and upstanding parallel side wall portions connecting the ends of upstanding parallel end wall portions and the other having a top with the window formed therein and side and end wall portions adapted to mate with the previously mentioned side and end wall portions to form the side and end walls of the case.

Preferably, semi-circular spindle locating depressions are formed in the free edges of the side wall portions of each case half at predetermined spaced distances for locating spindles carried by the respective spools.

Preferably, an operating knob adapted to be located outside the case is formed on a free end portion of a spindle at one end of each spool.

Preferably, four pairs of spools are provided, the first pair supporting a roll of transparent film on which a plurality of different sets of furniture replicas are mounted or painted, a second pair supporting a roll of transparent film on which are supported a plurality of different wall designs for a particular room, a third pair supporting a plurality of different ceiling designs for said room and the fourth pair supporting a plurality of different floor designs for said room, the ceiling designs and wall designs each being formed to match up with each other.

Preferably, the furniture replicas are scaled to suit the particular room and in one construction the floor designs may represent carpets of different colours, the colours changing in rainbow fashion through the spectrum from one end of the roll to the other.

Preferably, the depressions in the side wall portions of the halves of the case are suitably arranged so that those for the first pair of spools are nearest the end walls of the case and those for the second pair of spools are next nearest the end walls so that the roll of film carrying the furniture replicas can overlie the roll of film for the wall designs, the depressions for the spools for the ceiling designs and for the floor designs each being arranged next to each other and between the depressions for the spool carrying the wall designs so that the ceiling designs can be seen through the transparent portion of the roll carrying the wall designs and so that a chosen floor design can be seen through the next adjacent transparent portion of that roll.

Preferably, a locking arrangement is provided to lock each spool against rotation.

Preferably, a magnetic locking arrangement is provided, each spool, or one of each pair carrying a disc which is frictionally clamped to its associated case side wall by magnetic attraction. In one construction there is a magnetic strip down one side edge of the case, and a magnetically attractable disc associated with each spool, or one of the spools of each pair. Preferably, the spools are axially slidable relative to the case to disconnect the magnetic locking arrangement for winding on or back the rolls, to change the illustrative material.

Alternatively, the locking arrangement may include a sprocket-like wheel adapted to engage with a spring-loaded latch carried by the case.

Preferably, the window in the top of the case has a transparent sheet mounted therein on which register marks are provided with which corresponding register marks on the various wall designs on the second roll of film may be aligned.

Furthermore, corresponding register marks may be provided on one or more of the other rolls of film to assist in locating the rolls correctly in the window.

It is envisaged that the spools may be rotated and hence the rolls may be advanced across the window by means of electric motors operated by push buttons or the like.

Preferably, a magnetic rim is provided around the surface of the rim of the upper part of the case which touches the rim of the lower half of the case, and the axles of the spool are of ferrous metal, so that a spool or pair of spools can be taken out of the case temporarily, and rested on the magnetic rim, without any fear of the spools becoming unwound.

The invention is now described by way of example with reference to the drawings accompanying the provisional specification, in which:

FIG. 3 is a schematic side sectional elevation with the top half of the case partially open and showing how rolls of material are entrained around their spools.

Figure 1:
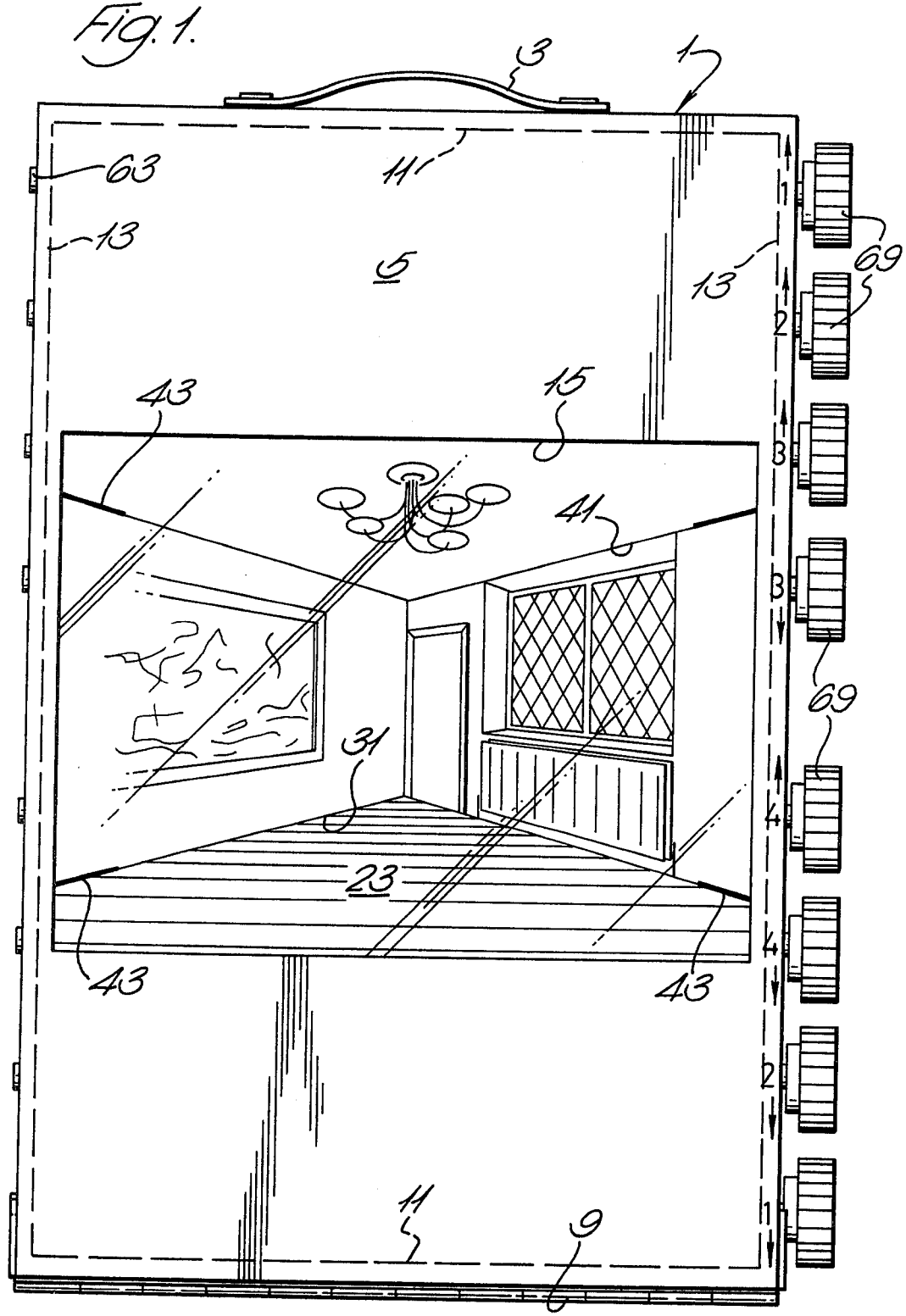
FIG. 1 is a plan view of a portable display device.

Referring to the drawings, the display device illustrated is portable and comprises a carrying case 1 with a handle 3, a top half 5 and a lower half 7 hingedly connected together at 9. The case is rectangular, each half having parallel end wall portions 11 connecting the ends of parallel side wall portions 13, these wall portions depending from the top wall of the half 5 and upstanding from the base of the lower half 7. A rectangular window 15 in which is mounted a transparent sheet of material, for example perspex, is formed in the top wall of the half 5 through which various interior design schemes, kitchen layouts, medical conditions or the like may be demonstrated. The remaining description will be with reference to interior design schemes.

The various interior design schemes are built up from design replicas supported on different rolls of material 17, 19, 21 and 23 supported within the case 1. The roll of material 17, which is for illustrating furniture replicas such as a desk 25, is formed of transparent film, and sets of replicas are mounted or painted at spaced intervals on the film. The roll 17 has one end wound upon a first pair of spools 27, 29 located, one adjacent each end of the case. The roll of material 19, which is again transparent, has mounted or painted thereon at spaced intervals a series of replicas in perspective of various wall designs for a particular room such as the designs 31, 33 and 35, the two ends of this roll being mounted on a second pair of spools 37, 39 located inwardly of the spools 27 and 29. The roll of material 21 has mounted or painted thereon a series of perspective replicas of various ceiling designs such as 41, each of which is so drawn that it will fit together with the wall design 31 so as to build up an interior design scheme for the room. For this purpose, it will be noted that the designs 31 and 41 are suitably located on their rolls such that the edge portions of the ceiling design will line up exactly with the top edge portions of the two illustrated walls in the design 31 and in order to assist in the correct lining up of the wall and ceiling designs, register marks 43 are provided on the sheet of material in the window 15 with which similar register marks on the wall design 31 can be aligned.

The roll of material 21 has its two ends wound upon spools 47 and 49 located next to each other in the case 1.

The roll of material 23 can be an ordinary sheet of paper on which is painted a plurality of different floor designs which may, for example, represent carpets of different colours and these colours may be so arranged that their colour shades change gradually in rainbow fashion through the spectrum from one end of the roll to the other. The roll 23 has its ends wound upon spools 57 and 59 located next to each other in the case, and the pair of spools 47 and 49 is so located in the case that the ceiling design replica 41 can be visible through a transparent portion 45 in the film 19, between the wall designs 31 and 33, whereas the pair of spools 57, 59 is so located in the case that a chosen floor design on the roll 23 is visible through the transparent portion 55 in the film 19 between the wall designs 31 and 35.

Figure 2:
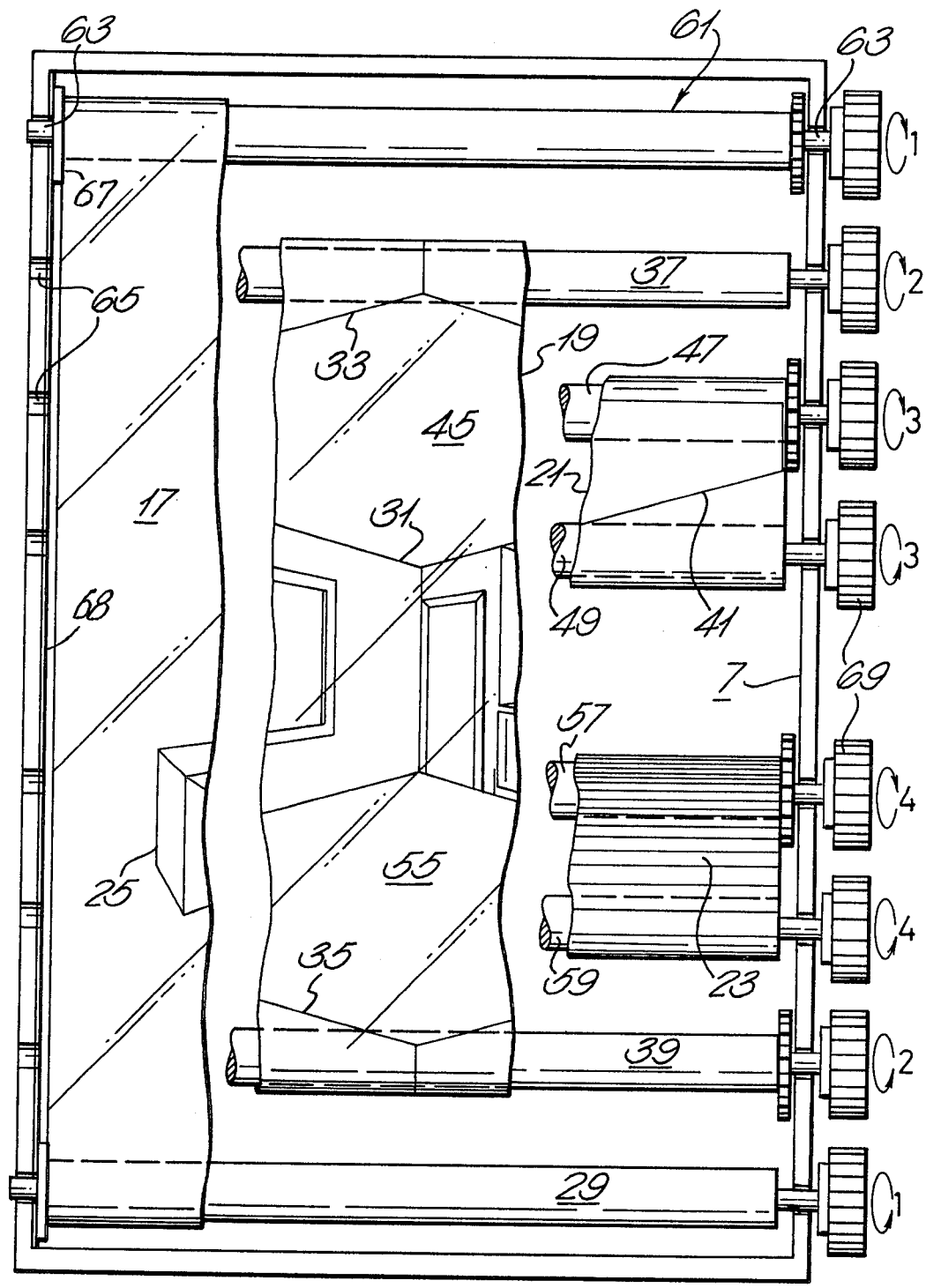
FIG. 2 is a view similar to FIG. 1, but with a top half removed and parts of the device broken away for the sake of clarity.

As can be seen from FIG. 2, each of the four rolls of material 17, 19, 21 and 23 is of the same width and mounted on pairs of spools of the same length. Each spool is substantially identical and includes a cylindrical portion 61 with an axially arranged central diametral slot (not shown) to receive a tongue on an end of a roll, this tongue either being fixed in position by means of self-adhesive tape or by magnetic attraction, for example. Projecting from each end of each cylinder 61 is a support spindle 63, arranged to be located for rotation in respective mating semi-circular depressions 65 in the free edges of the side wall portions of the case halves, so that the various spools are all arranged in parallel in the case for rotation relative to the case.

In order to tension the rolls on the spools and to prevent inadvertent rotation of the spools, each spool carries at one of its ends a ferrous metallic disc 67 which may be engaged by a magnetic strip 68 is located along the inside of the adjacent case wall, and the whole spool is axially shiftable so that the disc can be moved into and out of magnetic engagement with the strip. In order that each spool may be rotated, an operating knob 69 is mounted externally of the case on one of its spindles 63. It is preferred that all the operating knobs 69 are at the same side of the case, and these are provided so that the various spools of each pair can be rotated in the direction shown by the arrows on the right hand side of FIG. 2 so as to move the various design replicas on the various rolls across the window 15 as desired to build up an interior design scheme.

Alternative locking devices for resisting rotation of the spools may be provided.

As can be seen from FIG. 3, the roll of material 17 overlies the roll 19, whereas the other two rolls 21 and 23 are located beneath the roll 19. It will be appreciated that many numbers of rolls within reason may be provided, for example, if desired, an auxiliary roll carrying auxiliary furniture design replicas could overlie the roll 17, in which case an extra pair of spools would have to be provided between the ends of the case and the spools 27 and 29.

From the foregoing, it will be appreciated that with the four illustrated rolls, a vast number of different design schemes can be illustrated with this display device and this number can be increased considerably by replacing one or more of the rolls with a roll of alternative design replicas. This can be done either by mounting a new roll on the respective pair of spools or, alternatively, by removing the roll and its pair of spools and replacing it with a new roll and its pair of spools.

If it is desired to change the various design schemes in a semi-remote manner, a motor unit could be mounted on the case in place of the operating knobs 69 or, alternatively, so that the motors of the unit act on the spindles 63 at the other end of the various spools.

While the display device is particularly suited for illustrated design schemes, or as a kitchen planner, it could also be used for other purposes, such as teaching. In the medical field for example, the spools 47, 49, 57 and 59 could be replaced by a pair of spools 47, 59 carrying a background roll giving a background, on which various organs of the body could be illustrated by a film or roll supported on the spools 37, 39. Then, on the film supported on the spools 27, 29 a series of different diseases, for example, which could occur in the various organs of the body could be represented or illustrated. It will thus be appreciated that the device could be used to illustrate the advance of a particular disease affecting a particular body organ.

What is claimed is:

1. A display device suitable for illustrating a plurality of interior design schemes or for use as a teaching aid, said device comprising a case, at least two pairs of spools rotatably mounted in said case and extending across the case from one side wall to the opposite side wall, and being capable of limited axial sliding movement relative to said side walls, a roll of material adapted to be wound upon each of said pairs of spools, one of said rolls of material bearing alternative illustrations separated by transparent portions, a plurality of illustrations complimentary to said illustrations on said one roll on the other of said rolls, a window in a wall of said case through which the various alternative illustrations may be displayed with a chosen illustration formed on the said other roll showing through a transparent portion of said one roll and the two rolls being suitably relatively orientated so as to build up a picture visible through said window, and means for rotating each of said spools so as to advance one roll relative to the other as desired in either direction to vary the picture presented at said window, and wherein a magnetic strip is located down one side edge of the case, and a magnetically attractable disc is associated with at least one spool of each pair, the spools being axially slidable away from said magnetic strip to disconnect the magnetic locking arrangement for winding on or winding back the roll, to change the illustration, and being slidable into engagement with said magnetic strip after setting up said illustration, thereby preventing subsequent inadvertent rotation of said spools due to the natural resiliency of rolls of material thereon.

2. A display device as claimed in claim 1 wherein said case is portable and provided with a carrying handle and is formed of two superimposed halves, one half having a base and upstanding parallel side wall portions connecting the ends of upstanding parallel end wall portions and the other half having a top with said window formed therein and having side and end wall portions adapted to mate with the previously mentioned side and end wall portions to form the side and end walls of said case.

3. A display device as claimed in claim 2 wherein semi-circular spindle locating depressions are formed in the free edges of the side wall portions of each case half at predetermined spaced distances for locating spindles carried by the respective spools.

4. A display device as claimed in claim 3 wherein an operating knob adapted to be located outside the case is formed on a free end portion of a spindle at one end of each spool.

5. A display device as claimed in claim 1 wherein four pairs of spools are provided, the first pair supporting a roll of transparent film on which a plurality of different sets of furniture replicas are represented, a second pair supporting a roll of transparent film on which a plurality of different wall designs for a particular room is represented, a third pair supporting a plurality of representations of different ceiling designs for said room and the fourth pair supporting a plurality of different representations of floor designs for said room, said representations of said ceiling designs and wall designs each being formed to match up with each other.

6. A display device as claimed in claim 5 wherein said furniture replicas are scaled to suit the particular room.

7. A display device as claimed in claim 5 wherein the representations of said floor designs represent carpets of different colours, the colours changing in rainbow fashion through the spectrum from one end of said roll to the other.

8. A display device as claimed in claim 5, wherein said case is portable and provided with a carrying handle and is formed of two superimposed halves, one half having a base and upstanding parallel side wall portions connecting the ends of upstanding parallel end wall portions and the other half having a top with said window formed therein and having side and end wall portions adapted to mate with the previously mentioned side and end wall portions to form the side and end walls of said case, and wherein semi-circular spindle locating depressions are formed in the free edges of the side wall portions of each case half at predetermined spaced distances for locating spindles carried by the respective spools.

9. A display device as claimed in claim 8 wherein said depressions in the side wall portions of the halves of said case are suitably arranged so that those for said first pair of spools are nearest the end walls of said case and those for said second pair of spools are next nearest the end walls so that said roll of film carrying the furniture replicas can overlie said roll of film on which the wall designs are represented, the depressions for the said third and fourth spools are located next to each other and between said depressions for the second spool so that the representations of said ceiling designs can be seen through the transparent portion of said roll carrying the wall designs and so that a chosen representation of a floor design can be seen through the next adjacent transparent portion of that roll.

10. A display device as claimed in claim 1 wherein said window in the top of said case has a transparent sheet mounted therein on which register marks are provided with which corresponding register marks on the various illustrations on the second roll may be aligned.

* * * * *